(No Model.) 8 Sheets—Sheet 1.
W. A. CONNOLLY.
MACHINE FOR PICKING FUR SKINS.

No. 419,830. Patented Jan. 21, 1890.

WITNESSES:

INVENTOR:
W. A. Connolly
BY Munn & Co.
ATTORNEYS.

(No Model.)

W. A. CONNOLLY.
MACHINE FOR PICKING FUR SKINS.

No. 419,830. Patented Jan. 21, 1890.

Fig. 3.

WITNESSES:

INVENTOR:
W. A. Connolly
BY
Munn &Co
ATTORNEYS.

(No Model.) 8 Sheets—Sheet 4.

W. A. CONNOLLY.
MACHINE FOR PICKING FUR SKINS.

No. 419,830. Patented Jan. 21, 1890.

Fig. 4.

WITNESSES:
J. A. Criswell
C. Sedgwick

INVENTOR:
W. A. Connolly
BY Munn & Co.
ATTORNEYS.

(No Model.) 8 Sheets—Sheet 5.

W. A. CONNOLLY.
MACHINE FOR PICKING FUR SKINS.

No. 419,830. Patented Jan. 21, 1890.

WITNESSES:

INVENTOR:
W. A. Connolly
BY Munn & Co.
ATTORNEYS.

N. PETERS, Photo-Lithographer, Washington, D. C.

(No Model.) 8 Sheets—Sheet 6.
W. A. CONNOLLY.
MACHINE FOR PICKING FUR SKINS.

No. 419,830. Patented Jan. 21, 1890.

WITNESSES:
INVENTOR:
W. A. Connolly
BY Munn & Co.
ATTORNEYS.

(No Model.) 8 Sheets—Sheet 7.
W. A. CONNOLLY.
MACHINE FOR PICKING FUR SKINS.

No. 419,830. Patented Jan. 21, 1890.

WITNESSES:
INVENTOR:
W. A. Connolly
BY
Munn & Co.
ATTORNEYS.

(No Model.) 8 Sheets—Sheet 8.

W. A. CONNOLLY.
MACHINE FOR PICKING FUR SKINS.

No. 419,830. Patented Jan. 21, 1890.

WITNESSES:

INVENTOR:
W. A. Connolly
BY
Munn & Co.
ATTORNEYS.

UNITED STATES PATENT OFFICE.

WILLIAM A. CONNOLLY, OF NEW YORK, N. Y., ASSIGNOR OF THREE-FIFTHS TO BERNARD ALTMAN, VICTOR ALTMAN, AND JULIUS ALTMAN, ALL OF SAME PLACE.

MACHINE FOR PICKING FUR-SKINS.

SPECIFICATION forming part of Letters Patent No. 419,830, dated January 21, 1890.

Application filed August 23, 1889. Serial No. 321,730. (No model.)

*To all whom it may concern:*

Be it known that I, WILLIAM A. CONNOLLY, of New York city, in the county and State of New York, have invented a new and Improved Machine for Picking Fur-Skins, of which the following is a full, clear, and exact description.

My invention relates to an improvement in machines for picking fur-skins, and has for its object to provide a machine capable of automatically feeding the skin to place, blowing the soft hair to one side, and exposing thereby the coarse objectionable hair, retaining the skin in position for clipping the coarse hair, and feeding forward knives to act upon the latter.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 3:
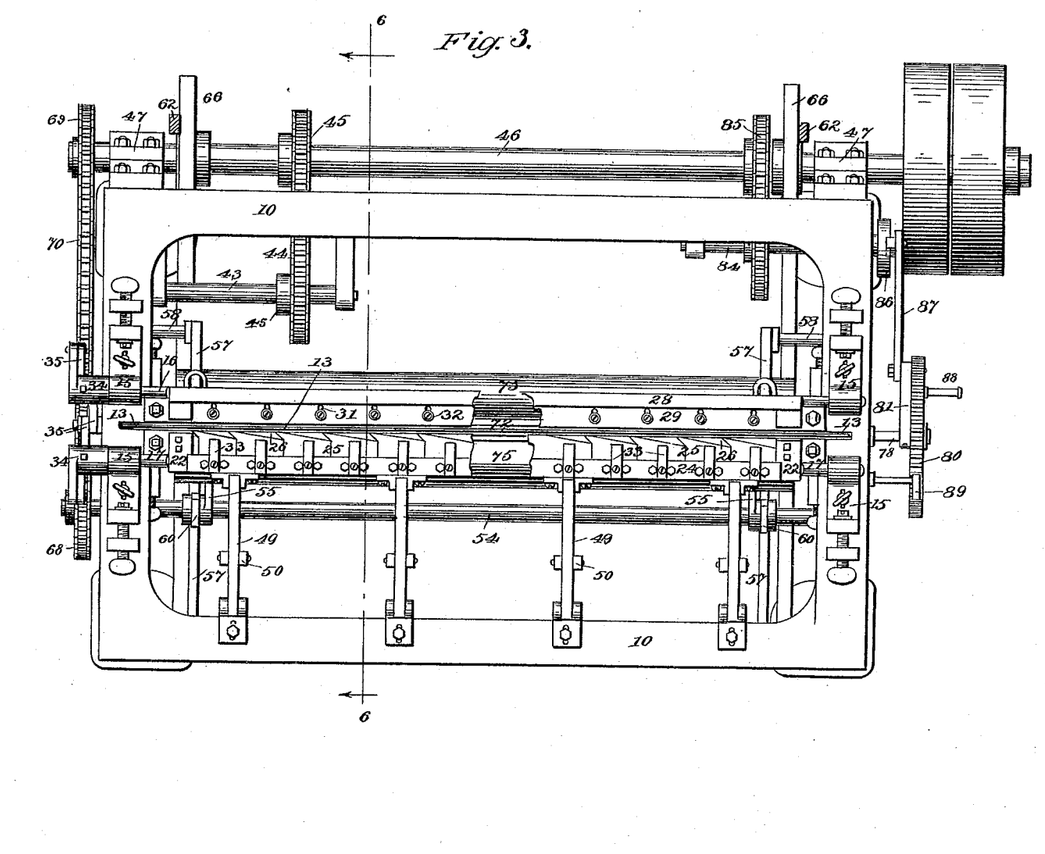
Fig. 3 is a plan view.
Figure 7:
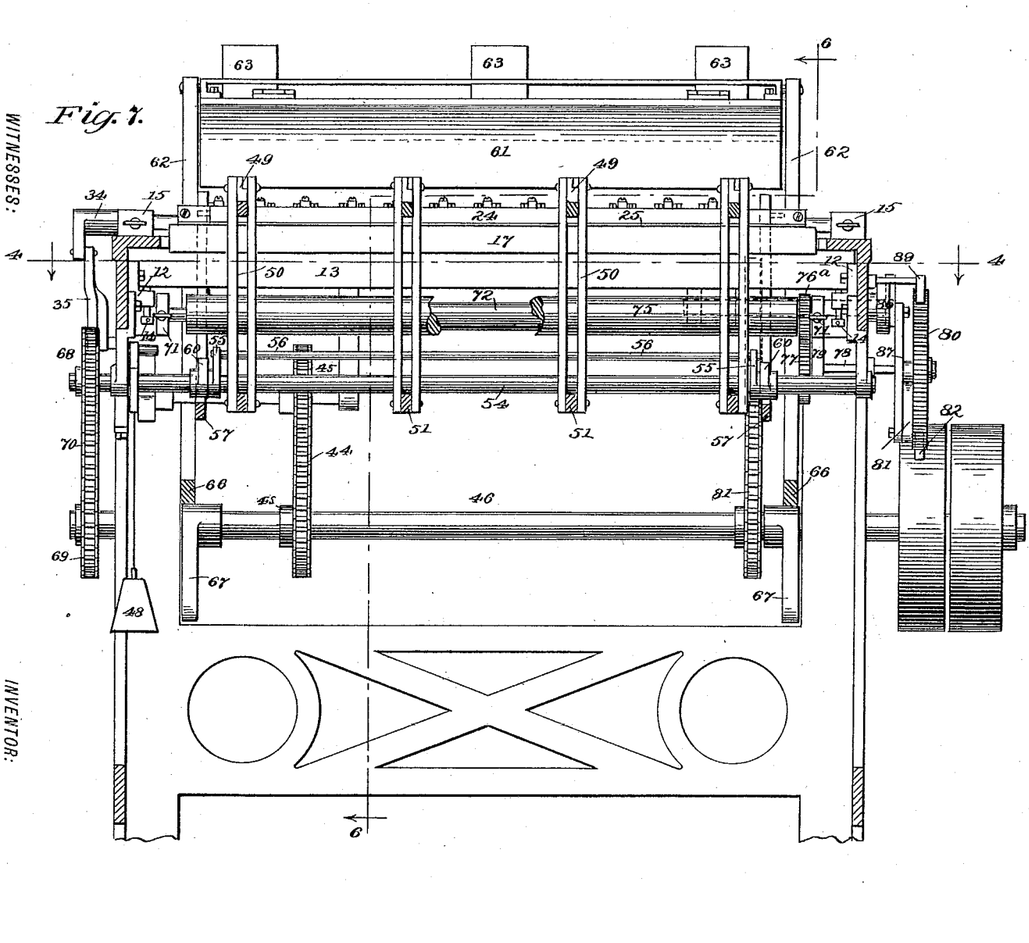
Fig. 7 is a vertical section on line 7 7 of Fig. 6, the bellows-nozzle being removed.

The frame consists of a rectangular skeleton table 10, supported by vertical end standards 11. To the inner face of each standard 11, at or near the center, a vertical bracket 12 is secured, as best illustrated in Fig. 7, and in said brackets the ends of a horse 13 are loosely fitted, which horse is adapted to support the skin to be treated, and extends upward through the slots in the ends of the table, as shown in Fig. 3. The horse is rendered vertically adjustable by a set-screw 14, passed through the lower portion of the brackets 12 to a contact with the under edge of the horse. The horse preferably consists of a bar of metal rectangular in cross-section.

Figure 13:
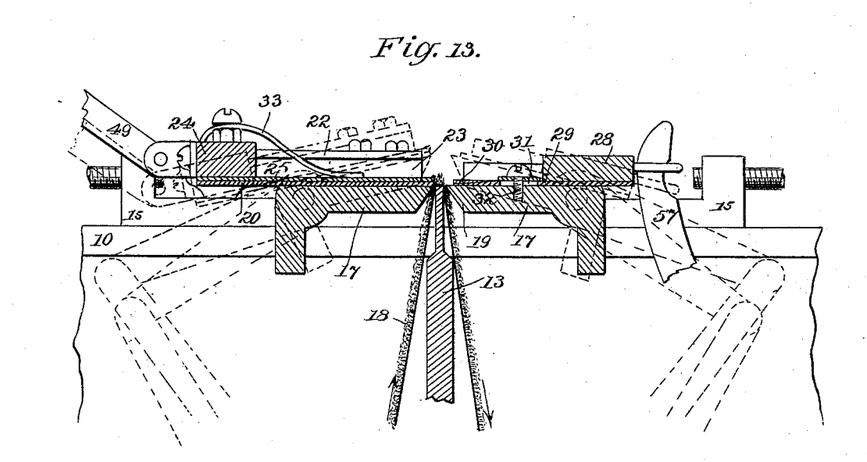
Fig. 13 is an enlarged transverse section through the retainers or clamping-bars, taken on line 13 13 of Fig. 14, illustrating in positive lines the closed position of the retainers and in dotted lines their open position.
Figure 14:
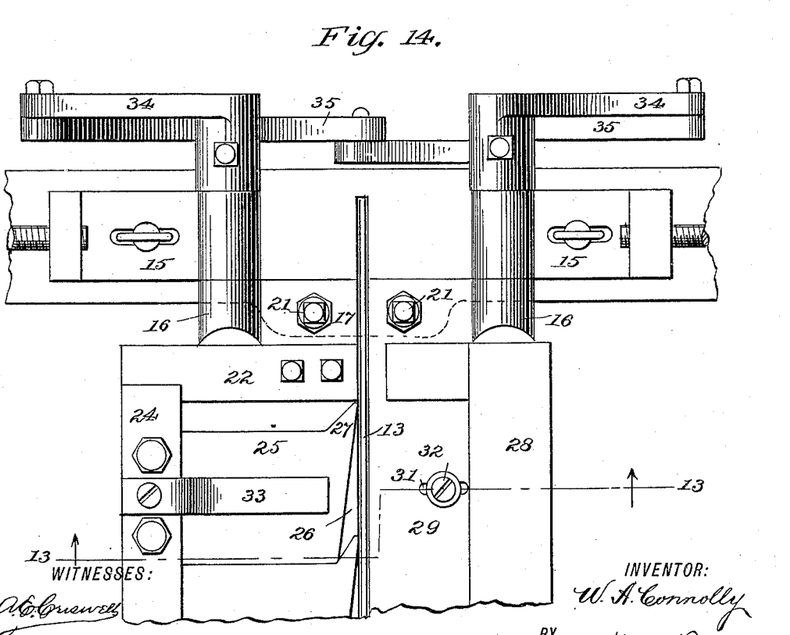
Fig. 14 is a plan view of Fig. 13.

At each side of the horse, upon the upper face of the ends of the table, a bearing-block 15, capable of lateral adjustment, is attached, as best shown in Figs. 3 and 13. In these bearing-blocks the trunnions 16 of two retaining or clamping bars 17 are journaled, which retaining-bars extend slightly beyond the ends of the table, their trunnions being integral with the outer side, as best illustrated in Fig. 14. One retaining-bar is located at each side of the horse 13.

The retaining-bars are essentially L-shaped in cross-section, their horizontal members being of such a length that when in the closed or horizontal position they will contact with the fur-skin 18, passed over the horse, as illustrated in Fig. 13; and in order that the contacting members of the retainers may be carried to the elevated position shown in dotted lines, Fig. 13, and thereby permit the skin 18 to be shifted, the inner ends of the said horizontal members are downwardly beveled, as illustrated at 19. These retainers are preferably made of metal, and upon the upper face of the left-hand retainer a brass wear-plate 20 is secured, which plate extends from end to end and projects beyond the outer sides.

The downward movement of the horizontal members of the retainers 17 is limited, preferably by a set-screw 21, passed through that portion of the members extending over the ends of the table, which set-screws at their inner ends contact with the latter. Thus, by adjusting the screws 21, the downward movement of the retainers may be stopped when their upper members are in the horizontal position, or when at a slight angle to the table, as in practice may be desired or found most advantageous. To the extremity of the left-hand retainer a guide-block 22 is transversely secured, as best illustrated in Fig. 14, which blocks are essentially rectangular in general contour, and provided with an undercut recess upon their inner faces, as best illustrated at 23 in Fig. 13. The guide-blocks 22 extend rearward the length of the wear-plate 20, and are connected at their outer ends by a bar 24, and to the under face of the said connecting-bar multiple knives 25 are secured, which knives extend inward in contact with the wear-plate 20 to the end of the inner extremity of the upper member of the retainer, as illustrated in Figs. 13 and 14. These knives are arranged in such manner that their opposed side edges will contact, and a sufficient number of knives are employed to extend from one guide-block 20 to the other. The cutting-edges of the knives are beveled transversely in triangular form, as illustrated at 26, and each knife at one side of the cutting-edge is provided with an essentially-triangular extension 27, which has a bearing upon the beveled surface of the knife next to it, thus providing a continuous cutting-edge free from breaks, extending, essentially, the entire length of the retainer. If an extension 27 were not provided for each knife, no matter how close the knives might be set together, a space would intervene sufficient to permit some of the objectionable hairs to escape being cut.

A bar 28 is made to extend, essentially, from end to end of the right-hand retainer in contact with the upper rear surface, which bar projects beyond the outer side of the retainer, and to the under face of the said bar 28 a continuous knife 29 is rigidly secured, the said knife preferably consisting of a brass plate adapted to slide upon the retainer, having brazed upon its inner end a steel cutter, as illustrated at 30 in Fig. 13; but the knife may be differently constructed, if so desired. The knife at intervals in its length is provided with a series of transverse slots 31, and through each slot a set-screw 32 is passed into the upper face of the retainer.

Each of the multiple knives sliding upon the left-hand retainer is held firmly to a bearing upon the wear-plate 20 by a spring 33, secured to the bar 24 and curved downward to a bearing upon the plate, as best shown in Fig. 3.

Figure 4:
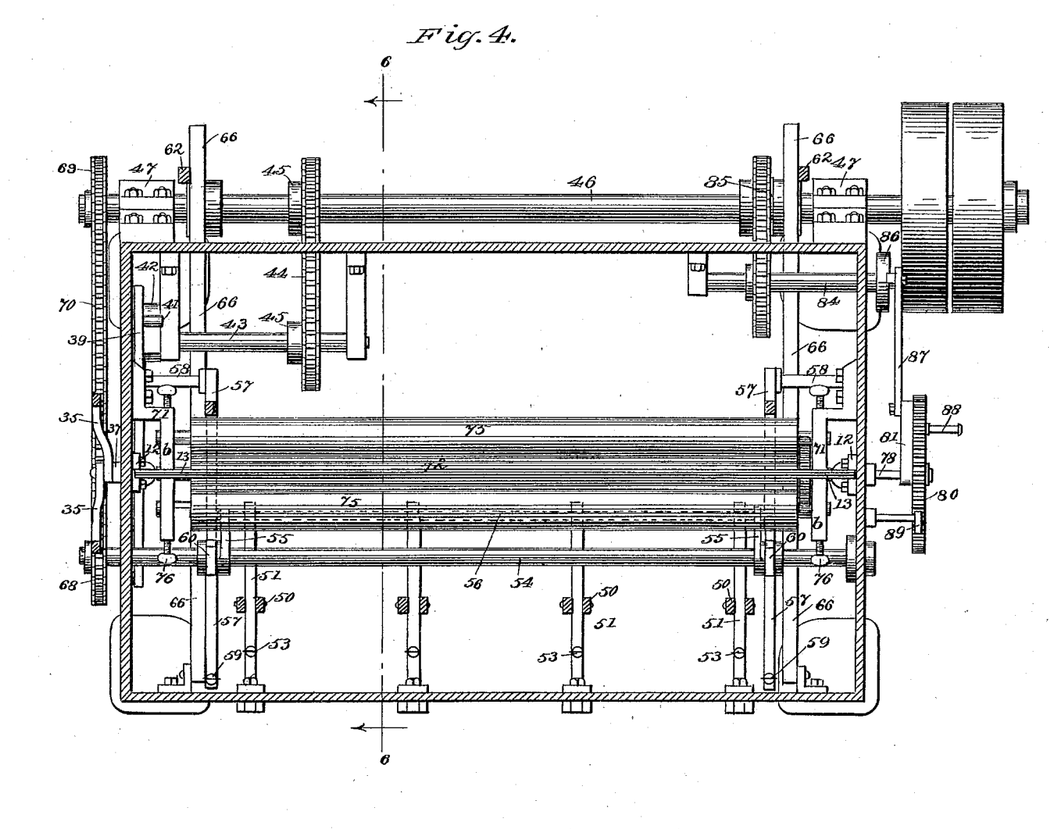
Fig. 4 is a horizontal section on line 4 4 of Fig. 7.
Figure 5:
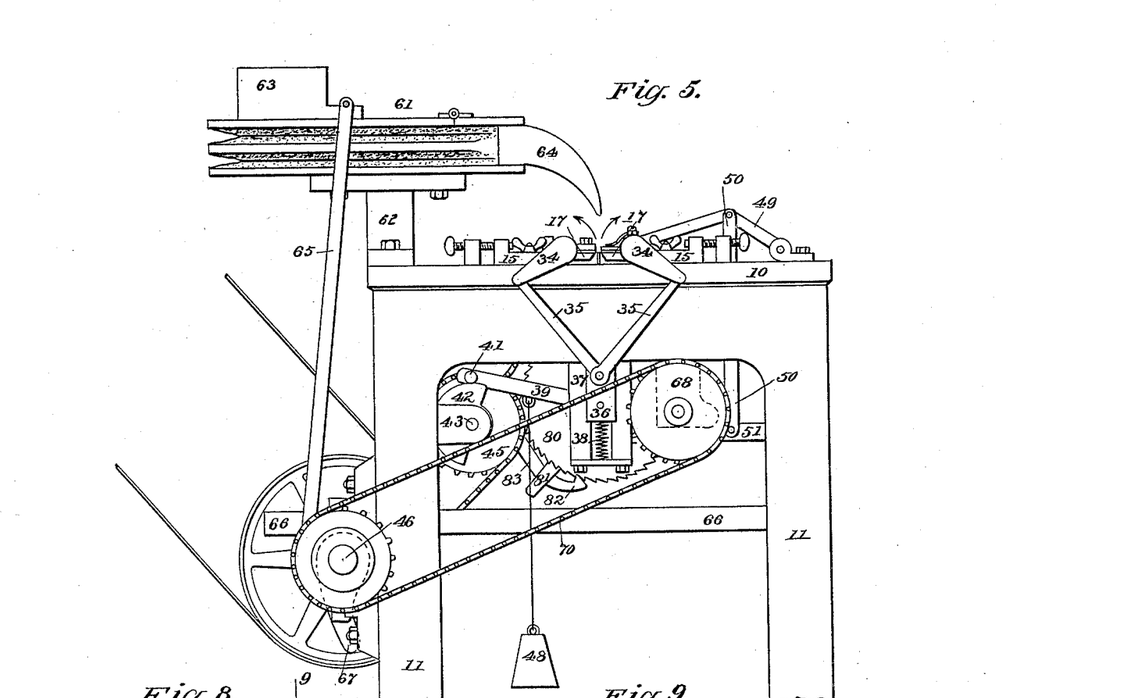
Fig. 5 is an elevation of the side of the machine opposite to that shown in Fig. 2, illustrating the mechanism for actuating the retainers.
Figures 6, 11, 12:
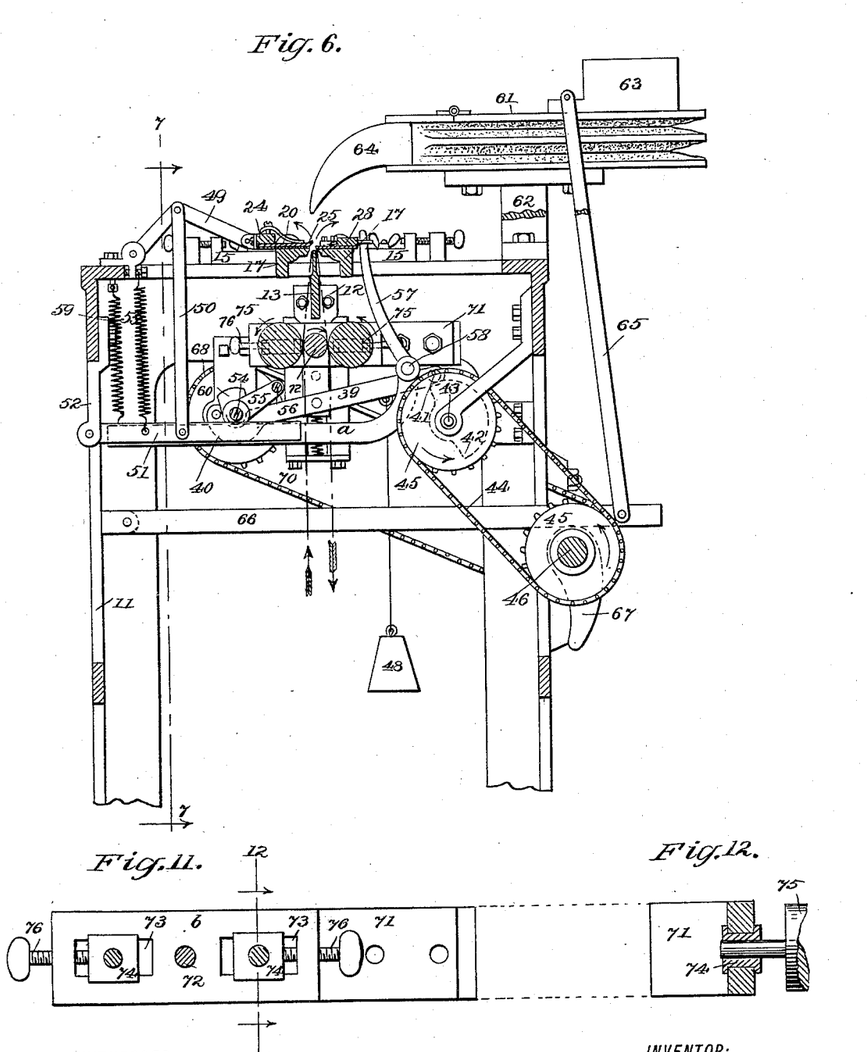
Fig. 6 is a vertical section on line 6 6 of Figs. 1, 3, 4, and 7.
Fig. 11 is a side elevation of the adjustable bearings of the feed-rollers.
Fig. 12 is a transverse section on line 12 12 of Fig. 11.
Figures 8, 9, 10:
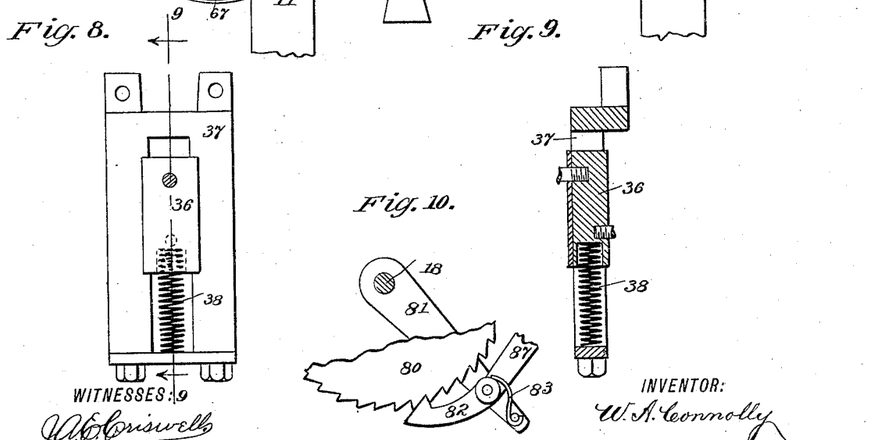
Fig. 8 is a plan view of the slideway of the retaining or clamping bars.
Fig. 9 is a section on line 9 9 of Fig. 8.
Fig. 10 is a partial detail view of the ratchet-movement of the feeding mechanism.

The retaining or clamping bars 17 are rocked in the following manner: A crank-arm 34 is rigidly secured to the trunnions of each retainer at one end of the table, as shown in Figs. 5 and 14, and to each of said crank-arms the upper end of a link 35 is pivoted, the lower ends of which links are pivotally connected to each other and to a block 36, held to vertically slide in a slotted hanger 37, projected downward from one of the end standards. This block 36 (shown in detail in Figs. 8 and 9) rests upon a spring-cushion 38, which spring when expanded retains the block in its normal position (shown in Fig. 5) and the upper members of the retainers in the horizontal or clamping position illustrated in the same figure. The block 36 is acted upon by a trip-arm 39, pivoted at one extremity to the end standard of the frame forward of the center of said standard, as shown in dotted lines at 40 in Fig. 6, and at its center to the block. At or near the rear end of the trip-arm 39, which is free to move, and upon its inner face, a pin 41 is secured, said pin being adapted for contact with a semicircular cam 42, fast upon a short shaft 43, located at the rear of the machine, as shown in Fig. 4, which short shaft is driven by sprocket-wheels 45 and a chain 44 from a main shaft 46, the latter shaft being journaled in suitable bearings 47 at the back of the machine, as best illustrated in Figs. 3, 4, and 6. To the under side of the trip-arm 39, near its rear end, a weight 48 is attached, sufficiently heavy to overcome the spring-cushion 38.

In operation, while the trip-arm contacts with the semicircular face of the cam, its presence is not felt by the block 36. The said block, being buoyed up by its spring-cushion, holds the retainers in their horizontal or clamping position. When, however, the trip-arm falls to a contact with the back of the cam, it and the attached weight 48 bears down upon the block 36 and overcomes its spring-cushion, whereby as the block is pressed downward the links 35 are straightened and the retainers forced upward to the open position shown in dotted lines, Fig. 13, carrying the knives upward with them.

The multiple knife-bar 24 is actuated as follows: Four or more toggle-arms 49 are pivoted to the said bar and to the forward side of the table 10 at suitable distances apart, each of the toggle-arms at its intermediate pivotal point having attached at both sides the upper ends of connecting-bars 50, and the lower ends of each set of connecting-bars are pivotally secured to a horizontal lever 51 at or near the center of the latter. One end of each of the levers 51 is pivotally attached to a hanger 52, projected downward from the front side of the machine, as best shown in Fig. 6. The levers 51 are capable of vertical movement, and are held normally in a horizontal position by springs 53, attached near the forward ends of the table.

Above the levers 51 a shaft 54 is longitudinally journaled in the standards 11, to which shaft, near its ends, fingers 55 are rigidly secured, connected by a rod 56, and as the shaft 54 revolves the rod 56 presses down the free ends of the levers 51, straightening the toggle-arms, whereby the knife-bar 24 and attached knives are forced forward in the direction of the horse 13, the knives passing over the said horse, the springs 53 acting to draw back the knives and knife-bar as soon as the rod 56 is carried out of contact with the levers. The knife sliding upon the right-hand retainer is actuated by two levers 57, each of which levers is fulcrumed upon a stud 58, projected from the end standards. The upper extremities of the levers are attached to the knife-bar 28, and the lower portion of each lever is curved downwardly and forwardly below its fulcrum, terminating in a horizontal member $a$, extending parallel with the levers 51 of the opposed multiple knives, as best illustrated in Fig. 6. This member $a$ of the levers is normally retained in a horizontal position by a coil-spring 59, attached to its extremity and to the under surface of the table, as is also best shown in Fig. 6.

The horizontal members $a$ of the levers 57 are acted upon by cams 60, located upon the longitudinal shaft 54, one cam being placed adjacent to each finger 55 of said shaft. In the revolution of the shaft 54 the cams 60 contact with and depress the horizontal members $a$ of the levers 57 before the levers 51 of the multiple knives are acted upon by the finger-rod 56. Thus the right-hand or single knife is carried inward over the horse first, the multiple knives following and sliding over the single knife, as the multiple knives are adapted to perform the function of cutting.

A bellows 61 is held horizontally over the top of the machine, being secured to standards 62, or their equivalent, fastened to the rear side of the table. This bellows is of sufficient length, preferably, to extend, essentially, from end to end of the machine, and is provided with a weight or weights 63 upon the top near the rear and a downwardly-curved nozzle 64, the outlet or mouth of which nozzle is in vertical alignment with the horse, over which the skin is placed, as shown in Fig. 6. At each end of the bellows one end of a link 65 is pivoted, the lower ends of the links being attached to horizontal bars 66, one of said bars being pivotally secured at the front of the machine near each end, the forward ends of the bars being so located that when in a horizontal position their rear ends will extend over and rest upon the main drive-shaft 46. These bars 66 are lifted at stated intervals by essentially hook-shaped cams 67, fast upon the said drive-shaft 46, as illustrated in Figs. 6 and 7. The shaft 54, carrying the finger-bar 56 and the cams 60, is driven from the main shaft 46, the said shaft 54 to that end being provided at one extremity with a sprocket-wheel 68, and the main shaft having a similar sprocket-wheel 69, the two wheels being connected by a chain belt 70.

To the inner face of each end standard, beneath the bracket 12, in which the horse is located, a horizontal bracket 71 is attached, the said bracket being essentially Z-shaped, and having one of its members only rigidly secured to the standard, as best shown in Fig. 4, whereby the other member extends horizontally beneath the horse 13 a distance from the inner face of the standards. In the center of the free member $b$ of the brackets the extremities of a small carrying-roller 72 are journaled, and at each side of this carrying-roller a longitudinal slot 73 is produced in the member $b$, in which slots boxes 74 are held to slide, as illustrated in detail in Figs. 11 and 12, and in each of the opposed boxes 74 of the brackets 71 the trunnions of a friction-roller 75 are journaled, which friction-rollers are of greater diameter than the carrying-roller 72, one of the friction-rollers being located at each side of the carrying-roller, as shown in Fig. 6. The said friction-rollers may be adjusted to and from the carrying-roller by means of set-screws 76, one of which set-screws is passed through each end of the bracket members $b$ to an engagement with a box 74.

Figure 1:
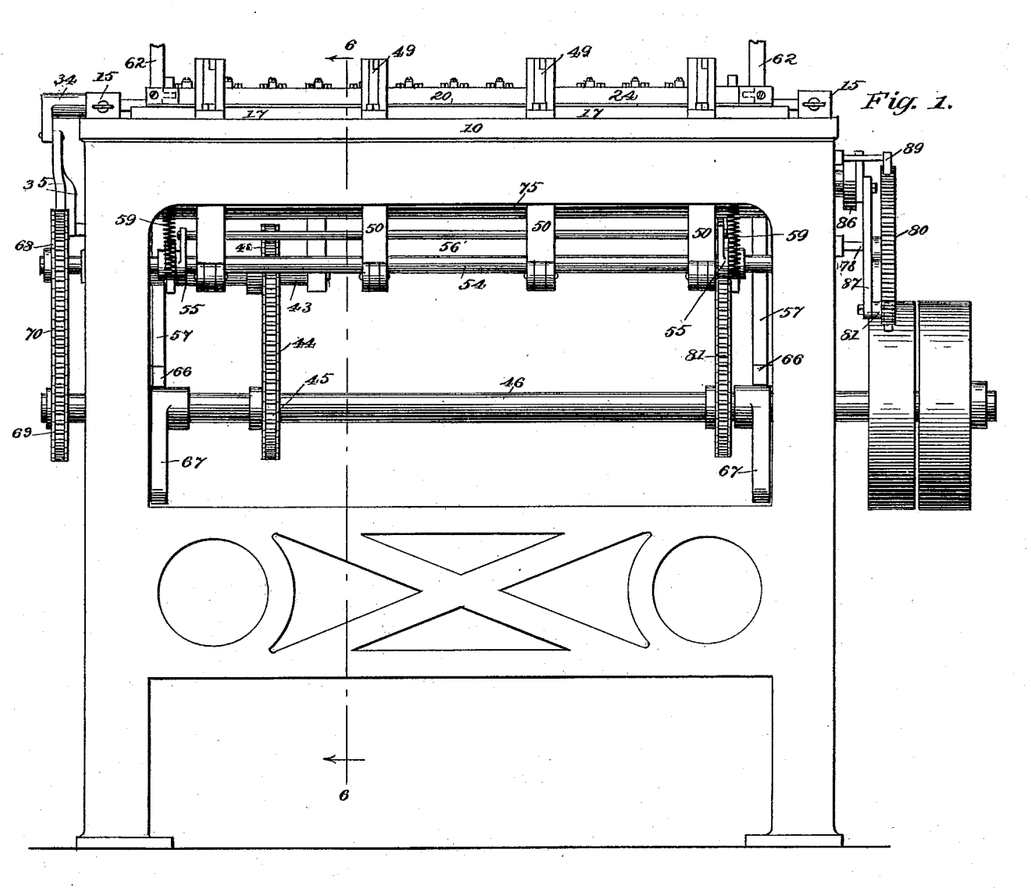
Figure 1 is a front elevation of the machine.
Figure 2:
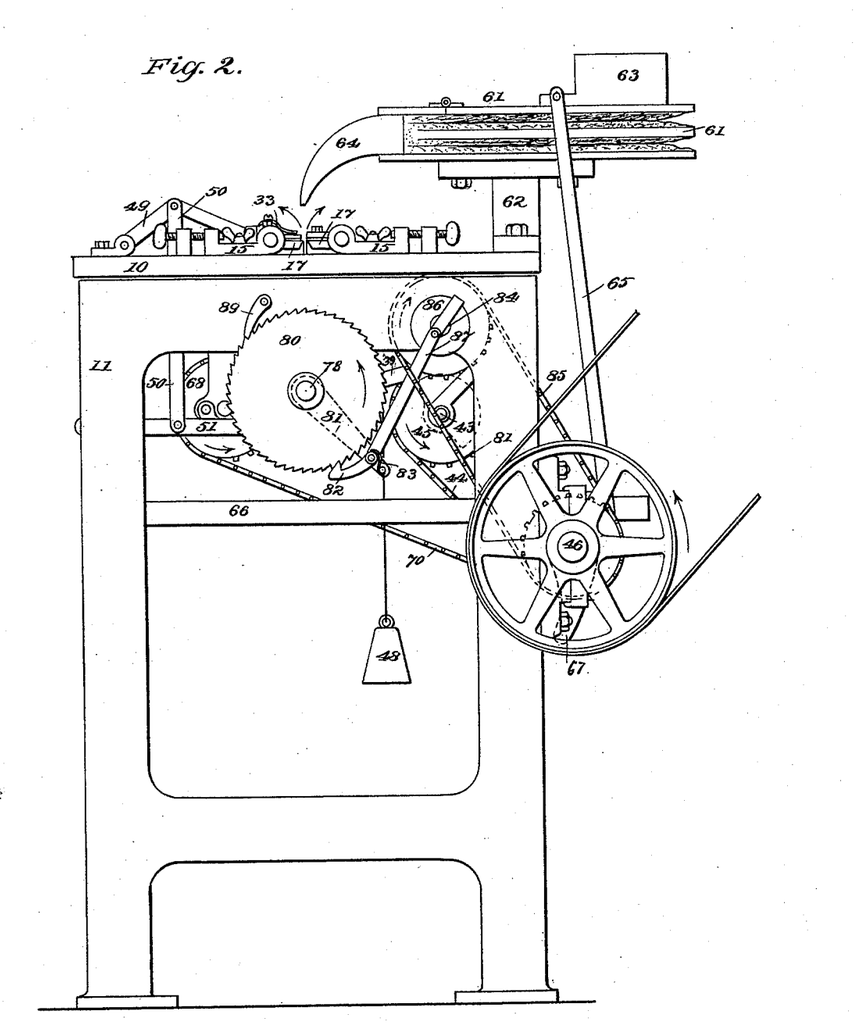
Fig. 2 is an elevation of the side carrying the feed-actuating mechanism.

Upon the right-hand end of the carrying-roller 72 a pinion $76^a$ is secured, which pinion meshes with a spur-wheel 77 upon the inner end of a spindle 78, journaled in the left-hand standard 11, and a hanger 79, projected downward from the right-hand bracket 71, as illustrated in Fig. 7. The spindle 78 projects beyond the standard, and has secured to its outer end a ratchet-wheel 80. An arm 81 is loosely mounted upon the spindle 78 at the rear of the ratchet-wheel 80, which arm is of sufficient length to extend beyond the periphery of the ratchet-wheel, as shown in Fig. 2, and to the lower end of said arm a dog 82 is pivoted and retained in contact with the teeth of the ratchet-wheel by a spring 83, attached also to the arm and having a bearing upon the dog.

At the rear of the machine a counter-shaft 84 is journaled in the right-hand standard 11, and a suitable bracket attached to the back of the frame, which counter-shaft is connected by suitable sprocket-wheels and a belt 85 to the main drive-shaft 46, as best shown in Fig. 4. The counter-shaft projects beyond the right-hand standard, and has attached to its outer end a crank-disk 86, and a link-connection 87 is effected between the said crank-disk and the lower extremity of the loosely-mounted arm 81, whereby as the counter-shaft is revolved the arm 81 is drawn upward sufficiently to move the ratchet-wheel a given number of teeth, whereupon the central roller 72 is also moved.

The ratchet-wheel 80 may be and preferably is provided with an attached handle 88, whereby it may be revolved by hand, and a pawl 89 is pivoted upon the standard, contacting with the upper portion of the ratchet-wheel to stop its backward movement.

The fur-skin to be treated is placed over the horse 13, being carried upward in contact with the rollers 72 and 75, as shown in Figs. 6 and 13. In practice a strip of canvas is secured to each end of the skin, in order that the fur at the extremities of the skin may be successfully treated and tension be exerted upon the skin by the ends of the canvas being retained between the friction and carrying rollers.

In operation, the skin having been placed in position upon the horse and the retainers having been carried to their upper or open position, (shown in dotted lines in Fig. 13,) upon the revolution of the drive-shaft 46, the bellows 61 is inflated and a jet of air brought to bear upon the surface of the skin at the top of the horse, which jet of air blows the soft hair down upon each side, leaving the strong coarse hair standing. The further revolution of the drive-shaft at this moment acts upon the mechanism described as actuating the retainers and forces them down to their closed position, whereby the retainers, contacting with the downwardly-slanting soft hairs, hold them in this position. As soon as the retainers are brought to this closed position, the air-jet ceases and the mechanism controlling the knives is acted upon, and the multiple knives being carried over the single opposed knife the standing hairs are thereby cut to within about one-sixteenth of an inch of the skin. As soon as the knives have operated, the knife-levers 51 and 57 are relieved from pressure and restored to their normal position by the springs 53 and 59, and at this moment the retainers are forced to their open position, the feed mechanism is acted upon by the main shaft, and the skin fed over the horse to present the entire surface to the jet of air, which is again forced upon the skin by the action of the bellows, and so the operation is repeated until the entire length of the skin has been successfully treated.

Having thus described my invention, I claim as new and desire to secure by Letters Patent—

1. The combination, with the frame, the horse, a main or drive shaft, vertically-rocking retaining or clamping bars at opposite sides of the horse and provided at one end with cranks 34, the vertically-sliding block 36, mounted in bearings on the frame, links 35, connecting the cranks and block, a spring throwing the block upward and holding the operating edges of the retaining-bars adjacent to the horse, a lever engaging said block, and a cam engaging the lever for operating it to slide the block, substantially as set forth.

2. The combination, with the frame, the horse, a main shaft, vertically-rocking retaining or clamping bars 17, having flat upper sides normally projecting toward the horse at opposite sides thereof, longitudinally-extending knives sliding on said flat upper sides toward and from each other and the horse, levers pivoted transversely on the frame below said bars, a longitudinal shaft 54, extending across said levers and provided with cams or projections for depressing said levers, and connections between said levers and the knives for reciprocating the latter, substantially as set forth.

3. The combination, with the frame, the horse, the main shaft, the parallel clamping or retaining bars 17, journaled at their ends in the frame at opposite sides of the horse and provided with cranks 34, the vertically-sliding spring-seated block 36, the links 35, connecting said block and cranks, the transverse lever 39, pivotally connected between its ends to said block, and the shaft 43, driven from the main shaft and provided with a cam 42 for operating the said lever, of the knives sliding on top of the retaining-bars, the lever 57, engaging one knife and having a horizontal member or arm $a$ projecting under the horse, the toggle 49, connected with the opposite knife, the depending link 50, the horizontal lever 51, pivotally connected with the lower end thereof and parallel with the lever 39 and member $a$, the shaft 54, parallel with shaft 43 and provided with cam projections for actuating the lever 51 and member $a$ after the cam 42 has acted on lever 39, and a connection between the main shaft and the shaft 54, substantially as set forth.

4. The combination, with the frame, the horse, and the clamping and cutting mechanisms at opposite sides thereof, of the carrying-roller 72 below and in vertical alignment with the horse, the parallel friction-rollers 75 in horizontal alignment at opposite sides of the guide-roller, devices for adjusting the rollers 75 toward and from the roller 72, and mechanism for rotating the roller 72, whereby the skin will be positively fed to and from the horse, substantially as set forth.

5. In a fur-picking machine, the combination, with a horse and rocking retaining or clamping bars journaled one at each side of the same, of a series of connected knives held to slide upon one of the retaining-bars, and a single knife arranged to slide upon the other retaining-bar, substantially as shown and described.

6. In a fur-picking machine, the combination, with a horse and rocking retaining or clamping bars journaled one at each side of the same, of a series of knives held to slide upon one of the rocking bars provided with a diagonally-beveled cutting-edge and a lip projected from one end of the said edge, and a single blade arranged to slide upon the opposite retaining-bar, substantially as shown and described.

7. In a fur-picking machine, the combination, with a horse and rocking retaining or clamping bars journaled one at each side of the horse, of a series of connected knives held to slide upon one of the retaining-bars, each provided with a diagonally-beveled cutting-edge and a lip extending from one end of said edge overlapping the contacting edge of the next knife, a single knife held to slide upon the opposite retaining-bar, and means, substantially as shown and described, for moving the multiple knives over the single knife, as and for the purpose specified.

8. In a fur-picking machine, the combination, with a horse and rocking retaining or clamping bars journaled one at each side of the same, a brass wear-plate being secured upon the upper surface of one of said retaining-bars, of a series of knives held to slide upon the said wear-plate, each provided with a diagonally-beveled cutting-edge and a lip extending from one end of said edge capable of overlapping the next knife, a single adjustable knife held to slide upon the opposite retaining-bar, and means, substantially as described, for moving the opposed knives inward over the horse and the multiple knives over the single knife, as and for the purpose specified.

9. In a fur-picking machine, a cutting-blade comprising a body-bar and a series of knives attached to the same, each knife being provided with a diagonally-beveled cutting-edge, and a lip projected from one end of the said edge, the lip of one knife extending over and upon the cutting-edge of the next knife, substantially as and for the purpose specified.

10. In a machine for clipping fur-skins, the knife 26, beveled transversely in triangular form and provided at one side of its cutting-edge with a triangular extension 27, substantially as set forth.

11. In a fur-picking machine, the combination, with a horse, a rocking retaining or clamping bar journaled at each side of the same, and knives movably supported by said retaining-bars, of curved levers attached to the body-bar of one knife, toggle-arms pivoted to the body-bar of the opposed knife or knives, trip-levers, a link-connection between the trip-levers and toggle-arms, a counter-shaft provided with a cam contacting with the curved levers and a crank-arm contacting with the trip-levers, a drive-shaft, and a connection, substantially as described, between the counter-shaft and drive-shaft, as and for the purpose specified.

12. In a fur-picking machine, the combination, with a horse and rocking retaining or clamping bars journaled one at each side of the horse, of knives held to slide over the retaining-bars and horse, a bellows arranged to direct a blast of air upon the horse, a drive-shaft, and connections between said drive-shaft, the retaining-bars, and the knives and bellows, which connections are so timed that the bellows will be depressed before the retaining-bars are closed and the knives forced over the horse when the retaining-bars are in their closed position, substantially as and for the purpose specified.

13. In a fur-picking machine, the combination, with a horse, a rocking retaining or clamping bar journaled at each side of the horse, and knives held to slide upon the said retaining-bars, of a bellows arranged to direct a blast of air upon the horse, a guide-roller journaled beneath the horse in vertical alignment therewith, and adjustable friction-rollers at each side of the guide-roller in horizontal alignment therewith, a drive-shaft, and a connection between the said drive-shaft, the retaining-bars, the knives, the bellows, and the guide-roller, substantially as shown and described, whereby the skin is first shifted upon the horse, subjected to a blast from the bellows, clamped by the retaining-bars, and then the objectionable hairs removed therefrom by the knives, as herein set forth.

14. The combination, with the table 10 and the longitudinally-extending horse, of the vertically rocking retaining or clamping bars 17 at opposite sides of the horse, and having its ends provided with screws 21, extending downward through said bars into contact with the upper side of the table to support the said bars in a horizontal or inclined position, substantially as set forth.

WILLIAM A. CONNOLLY.

Witnesses:
J. F. ACKER, Jr.,
C. SEDGWICK.